(12) United States Patent
Hermans et al.

(10) Patent No.: US 11,858,247 B2
(45) Date of Patent: *Jan. 2, 2024

(54) NONWOVEN CARRIER MATERIAL COMPRISING A FIRST PART AND A SECOND PART (71) Applicant: FREUDENBERG PERFORMANCE MATERIALS B.V., Arnhem (NL)

(72) Inventors: Gijsbertus Hermans, Nijmegen (NL); Johannes De Jonge, Arnhem (NL)

(73) Assignee: FREUDENBERG PERFORMANCE MATERIALS B.V., Arnhem (NL)

( * ) Notice: Subject to any disclaimer, the term of this patent is extended or adjusted under 35 U.S.C. 154(b) by 619 days.

This patent is subject to a terminal disclaimer.

(21) Appl. No.: 16/610,629

(22) PCT Filed: May 8, 2018

(86) PCT No.: PCT/EP2018/061825
§ 371 (c)(1),
(2) Date: Nov. 4, 2019

(87) PCT Pub. No.: WO2018/206554
PCT Pub. Date: Nov. 15, 2018

(65) Prior Publication Data
US 2020/0070475 A1  Mar. 5, 2020

(30) Foreign Application Priority Data
May 9, 2017   (EP) ..................................... 17170052

(51) Int. Cl.
*B32B 5/26* (2006.01)
*B32B 7/09* (2019.01)
(Continued)

(52) U.S. Cl.
CPC .................. *B32B 5/26* (2013.01); *B32B 3/06* (2013.01); *B32B 5/022* (2013.01); *B32B 5/028* (2013.01);
(Continued)

(58) Field of Classification Search
CPC .. B32B 5/26; B32B 3/06; B32B 5/022; B32B 2250/20; B32B 2419/06; B32B 2471/00;
(Continued)

(56) References Cited

U.S. PATENT DOCUMENTS 5,167,742 A    12/1992  Peters
2008/0014399 A1*  1/2008  Martin ................ B29C 66/8362
428/57

(Continued)

FOREIGN PATENT DOCUMENTS

CN    102 304 845 A    1/2012
JP    H11-117171 A    4/1999
(Continued)

OTHER PUBLICATIONS

Jun. 4, 2018 International Search Report issued in International Patent Application No. PCT/EP2018/061825.
(Continued)

*Primary Examiner* — Jasper Saberi
(74) *Attorney, Agent, or Firm* — Oliff PLC (57) ABSTRACT A nonwoven carrier material including at least a first part and a second part whereby the first and the second part including at least two layers of thermoplastic fibers. The first part and the second part are connected with each other in a connecting area to form the nonwoven carrier material whiteout thickness and weight variations in the connecting area. Further, a method for connecting a first and a second part of a nonwoven carrier material to form a connected nonwoven carrier material.

19 Claims, 6 Drawing Sheets

(51) Int. Cl.
- *B32B 7/027* (2019.01)
- *B32B 5/02* (2006.01)
- *B32B 5/08* (2006.01)
- *B32B 5/14* (2006.01)
- *B32B 7/12* (2006.01)
- *B32B 3/06* (2006.01)
- *E04D 5/06* (2006.01)
- *E04D 5/10* (2006.01)
- *B29C 65/00* (2006.01)

(52) U.S. Cl.
CPC ............... *B32B 5/08* (2013.01); *B32B 5/142* (2013.01); *B32B 5/145* (2013.01); *B32B 7/027* (2019.01); *B32B 7/09* (2019.01); *B32B 7/12* (2013.01); *E04D 5/06* (2013.01); *E04D 5/10* (2013.01); *B29C 66/1282* (2013.01); *B29C 66/12841* (2013.01); *B32B 2250/02* (2013.01); *B32B 2250/03* (2013.01); *B32B 2250/20* (2013.01); *B32B 2250/40* (2013.01); *B32B 2262/0261* (2013.01); *B32B 2262/0276* (2013.01); *B32B 2262/0284* (2013.01); *B32B 2262/101* (2013.01); *B32B 2262/12* (2013.01); *B32B 2307/30* (2013.01); *B32B 2307/54* (2013.01); *B32B 2307/718* (2013.01); *B32B 2307/732* (2013.01); *B32B 2419/06* (2013.01)

(58) Field of Classification Search
CPC .......... B29C 66/1282; B29C 66/12841; D06N 7/006; E04F 15/02005
See application file for complete search history.

(56) References Cited

U.S. PATENT DOCUMENTS

| | | |
|---|---|---|
| 2008/0295947 A1 | 12/2008 | Bourbeau et al. |
| 2015/0099098 A1* | 4/2015 | Bahukudumbi ........ B32B 5/028 428/190 |

FOREIGN PATENT DOCUMENTS

| | | |
|---|---|---|
| JP | 2004-091960 A | 3/2004 |
| WO | 82/02412 A1 | 7/1982 |
| WO | 2004/090211 A2 | 10/2004 |
| WO | 2015/018582 A1 | 2/2015 |
| WO | 2015/055619 A1 | 4/2015 |
| WO | 2015/165886 A1 | 11/2015 |

OTHER PUBLICATIONS

Jun. 4, 2018 Written Opinion issued in International Patent Application No. PCT/EP2018/061825.

* cited by examiner

NONWOVEN CARRIER MATERIAL COMPRISING A FIRST PART AND A SECOND PART

The invention pertains to a nonwoven carrier material comprising at least two layers of thermoplastic fibers, whereby the nonwoven carrier material comprises at least a first part and a second part whereby the first and the second part are connected via a connecting area with each other to form the nonwoven carrier material. The invention pertains also to a method for connecting a first and a second part of a nonwoven carrier material.

Nonwoven carrier materials comprising thermoplastic fiber layers are known in the prior art. Such materials are being used in many applications such as for example bitumen roofing membranes, roofing underlayment sheets, carriers for filter media, primary backings for tufted carpets and (cushion) vinyl floor coverings.

During manufacturing processes of nonwoven carrier material disturbances can occur in the web-forming process and/or in the bonding process, resulting in a quality in the nonwoven carrier material that needs to be rejected from the nonwoven carrier material, meaning cut-out.

Nonwoven carrier material is normally sold as rolled goods, whereby per nonwoven type and/or per application the length of every roll should preferably be the same. During certain manufacturing processes of the nonwoven carrier material thermoplastic fibers are unwound from a plurality of bobbins. If some fibers break during the unwinding phase the obtained nonwoven carrier material has some defect, such as holes or bundles of fibers.

These defect areas are cut out of or cut off from the nonwoven carrier material and replaced by nonwoven carrier material with correct material properties. Therefore, different parts of materials are laid together butt joint wise or on top of each other and connected with each other to create a continuous material. Such a connection between two parts of materials results in a connecting area with higher material thickness or an area with a textile seam between the two parts causing locally other properties. This thickness and properties variation in the connecting area is not desired for many applications.

The object of the invention is to provide an improved nonwoven carrier material comprising at least a first part and a second part, whereby the first part and the second part are connected with each other via a connecting area without the disadvantages of the prior art. The object of the invention is also an improved method for connecting a first part and a second part of a nonwoven carrier material with each other without the disadvantages of the prior art.

The object of the invention is achieved by a method for connecting at least a first part and a second part of a nonwoven carrier material according to claim 1 and a nonwoven carrier material according to claim 6.

In the following the term "first thermoplastic fiber layer" and "first fiber layer" are synonymously used. Also the term "second thermoplastic fiber layer" and "second fiber layer" are synonymously used.

To avoid a lack of understanding, the claimed nonwoven carrier material is a combination of a first nonwoven carrier material (named first part) and a second nonwoven carrier material (named second part) which are combined with each other in a novel and inventive way without increasing the thickness of the nonwoven material (especially in the connecting area), or at least reducing the difference of the thickness in the connecting area as compared to the remainder of the nonwoven carrier material.

The first part of the nonwoven carrier material comprises a first and a second thermoplastic fiber layer. However, in a first embodiment the first and second thermoplastic fiber layer of the first part are created from a single (starting) thermoplastic fiber layer. To create the first and second thermoplastic fiber layer from a single starting thermoplastic fiber layer two methods are possible: The first method would be to remove a part of the thickness of the starting thermoplastic fiber layer by an abrasive like method that uses a milling or grinder like technique such as skiving. The second method would include a separating step by cutting in plane into the starting thermoplastic fiber layer and creating the first and second thermoplastic fiber layer and then removing a part of the first or second thermoplastic fiber layer. By these methods of creating the first and the second thermoplastic fiber layer the nonwoven carrier material is reduced in thickness, preferably to about half of the original thickness. In this embodiment the removing and/or separating step creates two independent thermoplastic fiber layers (first and second fiber layer). This embodiment is also applicable for the second part. This means, also the second part may comprise a single starting thermoplastic fiber layer and in a separating step a first and second thermoplastic fiber layer of the second part is created.

In a second embodiment the first part (and the second part) comprises independent first and second thermoplastic fiber layers. This means a first thermoplastic fiber layer and a second thermoplastic fiber layer are laid together to form the first (and second) part of the nonwoven carrier material. Also in this embodiment a separating step is used to separate the first and the second thermoplastic fiber layer (in the first part and in the second part) from each other. During this separating step the two independent first and second thermoplastic fiber layers are obtained again (at least in the connecting area). Additionally, abrasive methods can be used to remove a part of the thickness of the first part (and second part) of the nonwoven carrier material to obtain again a first and second thermoplastic fiber layer of the first (and second) part.

Preferably, for removing a part of the thickness of the first and/or second part by an abrasive method a skiving device is used.

Preferably, the first thermoplastic fiber layer of the second part is composed of the same type of fibers as the first thermoplastic fiber layer of the first part of the nonwoven carrier material.

Preferably, the second thermoplastic fiber layer of the second part is composed of the same type of fibers as the second thermoplastic fiber layer of the first part of the nonwoven carrier material.

In a preferred embodiment, the second thermoplastic fiber layer of the first part, the first thermoplastic fiber layer of the second part and the second thermoplastic fiber layer of the second part are all composed of the same type of fibers as the first thermoplastic fiber layer of the second part of the nonwoven carrier material.

In a preferred embodiment, the first fiber layer of the first part is composed of the same type of fibers as the first fiber layer of the second part and the second fiber layer of the first part is composed of the same type of fibers as the second fiber layer of the second part.

It is also preferable that the first fiber layer of the first part, the first fiber layer of the second part, the second fiber layer of the first part and the second fiber layer of the second part are composed the same types of fibers.

Within the scope of the present invention it is understood that the term fibers refers to both staple fibers and filaments.

Staple fibers are fibers which have a specified, relatively short length in the range of 2 to 200 mm. Filaments are fibers having a length of more than 200 mm, preferably more than 500 mm, more preferably more than 1000 mm. Filaments may even be virtually endless, for example when formed by continuous extrusion and spinning of a filament through a spinning hole in a spinneret.

The fibers may have any cross sectional shape, including round, trilobal, multilobal or rectangular, the latter exhibiting a width and a height wherein the width may be considerably larger than the height, so that the fiber in this embodiment is a tape. Furthermore, said fibers may be mono-component, bi-component or even multi-component fibers.

The nonwoven carrier material may be any type of nonwoven, such as for example staple fiber nonwovens produced by well-known processes, such as carding processes, wet-laid processes or air-laid processes or any combination thereof.

The nonwoven carrier material may also be a nonwoven composed of filaments produced by well-known spunbonding processes wherein filaments are extruded from a spinneret and subsequently laid down on a conveyor belt as a web of filaments and subsequently bonding the web to form a nonwoven layer of fibers, or by a two-step process wherein filaments are spun and wound on bobbins, preferably in the form of multifilament yarns, followed by the step of unwinding the multifilament yarns and laying the filaments down on a conveyor belt as a web of filaments and bonding the web to form a nonwoven carrier material of fibers.

Preferably, the fibers in the at least two thermoplastic fiber layers of the first part and/or the second part are filaments in order to provide higher tensile strength and/or higher tear strength to the nonwoven carrier material and/or to the final (impregnated) product, such as for example a bitumen roofing membrane, a roofing underlayment sheet, a carrier for filter media, a tufted carpet or a (cushion) vinyl floor covering.

The at least two thermoplastic fiber layers of the first part and/or the second part may be composed of thermoplastic fibers for at least 50 wt. % of the total weight of fibers in the at least two fiber layers, preferably for at least 75 wt. %, more preferably for at least 90 wt. %, even preferably for at least 95 wt. %. Increasing the amount of thermoplastic fibers in the at least two fiber layers increases the tensile strength and/or tear resistance and increases the flexibility of the nonwoven carrier material and/or the final (impregnated) product.

In an embodiment the first and the second fiber layer of the first part and/or the second part are composed for 100 wt. % of thermoplastic fibers of the total weight of fibers in the fiber layers.

The thermoplastic polymer from which the thermoplastic fibers in the first and/or second fiber layer are composed may be any type of thermoplastic polymer capable of withstanding elevated temperatures such as for example encountered in manufacturing processes for bitumen roofing membranes, roofing underlayment sheets, carrier for filter media, tufted carpets and (cushion) vinyl floor coverings. The thermoplastic fibers may comprise a polyester, such as for example polyethylene terephthalate (PET) (based either on DMT or PTA), polybutylene terephthalate (PBT), polytrimethylene terephthalate (PTT), polyethylene naphthalate (PEN) and/or polylactic acid (PLA), a polyamide, such as for example polyamide-6 (PA6), polyamide-6,6 (PA6,6) and/or polyamide-6,10 (PA6,10), polyphenylenesulfide (PPS), polyethyleneimide (PEI) and/or polyoxymethylene (POM) and/or any copolymer or any blend thereof.

In an embodiment, the thickness variation of the nonwoven carrier material—including the connecting area—is less than 0.20 mm, preferably less than 0.15 mm, more preferably less than 0.10 mm and most preferably less than 0.05 mm, measured perpendicular to the main extension direction of the nonwoven carrier material (see FIG. 5), i.e. the average thickness of the connecting area preferably does not exceed the average thickness of the remainder of the nonwoven carrier material The term "less than 0.15 mm" includes a tolerance of ±0.1 mm. The thickness is determined in accordance with DIN ISO 9073-2 (October 1996).

In an embodiment, the average weight of the connecting area, i.e. the combined weight of the first part A and the second part B in the connecting area, differs by at most 20 wt. %, more preferred by at most 10 wt. %, and most preferred by at most 5 wt. %, from the average weight of the nonwoven carrier material excluding the connecting area. The term "of at least" means in this context a tolerance of 0.5 to 1.5 wt. %.

The first part and the second part of the nonwoven carrier material form together a form-fit connection in the connecting area. The first part and the second part fit together in the connecting area like puzzle parts. Due to this form-fit connection thickness variation can be diminished (due to avoidance of double first and/or second fiber layers in the connecting area) and a kind of force-fit is created. Due to this kind of force-fit the permanent connection of the first part and the second part via (for example) consolidation techniques like calendaring, mechanical needling, hydroentanglement, ultrasonic bonding, thermal bonding, preferably by hot air, or by any combination thereof is easier (no slipping of different layers during consolidation) and/or a stronger connection is obtained.

Preferably, a combination of mechanical needling of the connecting area followed by thermal bonding of the connecting areas can be applied to obtain increased strength of the connecting area due to entanglement of the fibers between the first part and the second part in the connecting area.

In a further embodiment, a suitable binder is used to improve the bonding between the first part and the second part. The binder can be a chemical binder, a thermal binder such as a thermoset polymer, a pressure sensitive adhesive, a pressure and heat activatable adhesive or an adhesive activated by irradiation such as by UV-irradiation.

In an embodiment, a scrim is arranged between the at least two fiber layers. A scrim is preferably arranged between the first and second fiber layer of the first part and between the first and second fiber layer of the second part. The scrim is preferably a woven scrim or a laid scrim. The scrim secures the distance between the fibers in the first and second fiber layer of the nonwoven carrier material, and may provide improved tensile strength, improved dimensional stability, i.e. reduced elongation at a specific load applied to the nonwoven carrier material, and/or improved tear strength to the nonwoven carrier material. In respect of the advantages of using a scrim, applicant further refers to WO 2015055619 A1.

In an embodiment, the scrim is made of glass fibers or other high modulus fibers of at least 5 GPa, preferred of at least 10 GPa, more preferred of at least 15 GPa, more preferred of at least 20 GPa, more preferred of at least 25 GPa, more preferred of at least 40 GPa, more preferred of at least 50 GPa, most preferred of at least 75 GPa.

In an embodiment, the threads of the scrim extending in the longitudinal direction of the carrier material comprise high modulus yarns, such as for example polyester yarns, such as polyethylene terephthalate (PET) yarns, polyamide yarns, such as polyamide-6 (PA6) yarns, glass yarns, aramid yarns or carbon yarns and/or other high modulus yarns or any combination thereof. In a preferred embodiment a glass scrim is used which has the following specification:

33 warps threads per 25 cm and 21 weft threads per 25 cm
In machine direction:
Titer: 34 tex
110-130 N/5 cm strength
2.8-3.7% Elongation at break
In cross machine direction:
Titer: 34 tex
68-80 N/5 cm strength
2.5-3.0% Elongation at break In an embodiment, a scrim may be arranged in the first thermoplastic fiber layer of the first part, and a scrim may be arranged in the second thermoplastic fiber layer of the second part of the nonwoven carrier material. In this embodiment, the connecting area will comprise both the scrim arranged in the first thermoplastic fiber layer of the first part and the scrim arranged in the second thermoplastic fiber layer of the second part to obtain improved dimensional stability in the nonwoven carrier material.

Preferably, the scrim arranged in the first thermoplastic fiber layer of the first part is arranged close to interface between the first thermoplastic fiber layer and the second thermoplastic fiber layer of the first part, and preferably the scrim arranged in the second thermoplastic fiber layer of the second part is arranged close to interface between the second thermoplastic fiber layer and the first thermoplastic fiber layer of the second part to enable improvement of the load transfer between the scrims in the connecting area of the combined nonwoven carrier material. When the scrims are closer together in the connecting area during consolidation of the form-fit connection in the connecting area, improved bonding between the scrims will be obtained.

Preferably, the scrim arranged in the first thermoplastic fiber layer of the first part is arranged at a distance from the interface between the first thermoplastic fiber layer and the second thermoplastic fiber layer of the first part, which is less than 50%, more preferably less than 40%, even more preferably less than 30%, most preferably less than 20%, of the thickness of the first thermoplastic fiber layer of the first part.

The scrim arranged in the first thermoplastic fiber layer of the first part, may have been arranged at the center line of the thickness of a single starting thermoplastic fiber layer, which is reduced in thickness at the connection area by less than 50%, but preferably by at least 15%, preferably by at least 25%, more preferably by at least 30%, most preferably by at least 40%, to create the first and the second thermoplastic fiber layer of the first part. By reducing the thickness of the single starting thermoplastic fiber layer by less than 50% the risk of damaging the scrim is reduced to improve the dimensional stability of the nonwoven carrier material.

Preferably, the scrim arranged in the second thermoplastic fiber layer of the second part is arranged at a distance from the interface between the second thermoplastic fiber layer and the first thermoplastic fiber layer of the second part which is less than 50% of the thickness, more preferably less than 40%, even more preferably less than 30%, most preferably less than 20% of the second thermoplastic fiber layer of the second part.

The scrim arranged in the second thermoplastic fiber layer of the second part may have been arranged at the center line of the thickness of a single starting thermoplastic fiber layer, which is reduced in thickness at the connection area by less than 50%, but preferably by at least 15%, preferably by at least 25%, more preferably by at least 30%, most preferably by at least 45%, to create the first and the second thermoplastic fiber layer of the second part. By reducing the thickness of the single starting thermoplastic fiber layer by less than 50% the risk of damaging the scrim is reduced to improve the dimensional stability of the nonwoven carrier material.

Prior art nonwoven carrier materials may comprise a scrim, which preferably is located at the center line of the thickness of the carrier material. When a connection between a first part and a second part of the nonwoven carrier material is made by laying the first part on top of the second part, the distance between the scrim comprised in the first part and the scrim comprised in the second part is equal to the total thickness of first part or second part of the nonwoven carrier material. The first part and the second part of such prior art nonwoven carrier materials may be connected to each other by applying an adhesive tape at the interface between the first part and the second part and by applying heat and/or pressure at the connecting area to allow the adhesive to flow into the interstices between the fibers of the nonwoven and the scrim. However, to obtain sufficient dimensional stability in such prior art nonwoven carrier materials a relatively large amount of adhesive has to be applied to establish a sufficiently strong connection between both scrims, which adhesive becomes distributed throughout the entire thickness of the connecting area after applying heat and/or pressure. As a consequence the connecting part cannot be impregnated, for example by bitumen or PVC plastisol, which leads to rejected material during manufacturing of e.g. bitumen membranes or vinyl flooring as the connecting area will be visible in the bitumen membranes or vinyl flooring.

When the scrim arranged in the first thermoplastic fiber layer of the first part is located at a distance from the interface between the first thermoplastic fiber layer and the second thermoplastic fiber layer of the first part which is less than 50% of the thickness of the first thermoplastic fiber layer of the first part and/or the scrim arranged in the second thermoplastic fiber layer of the second part is located at a distance from the interface between the second thermoplastic fiber layer and the first thermoplastic fiber layer of the second part which is less than 50% of the thickness of the second thermoplastic fiber layer of the second part, the amount of adhesive applied, e.g. by an adhesive tape, in the connecting area can be reduced when establishing a connection between both scrims in the connecting area, and/or the temperature and/or pressure applied can be reduced. As a consequence, the adhesive will not become distributed throughout the entire thickness of the connecting area after applying heat and/or pressure and will leave the outer surfaces of the nonwoven carrier material completely, or at least substantially, free of adhesive, i.e. less than 10% of the surface of the nonwoven carrier material is covered by an adhesive, which allows to (at least partly) impregnate the nonwoven carrier material, for example with bitumen or PVC plastisol, without the connecting area being visible in the bitumen membranes or vinyl flooring.

When the nonwoven carrier material is used as a primary backing for tufted carpet, the tufting needles will be deflected less, as the connecting area exhibits reduced increase of thickness and/or comprises less adhesive.

Further, if the nonwoven carrier material is used to be impregnated with bitumen, unevenness in form of double thickness of the nonwoven carrier at the seam, as it is shown by the prior art, does not occur. Therefore, the process to produce bituminous roofing membrane is less disturbed at least for the impregnation of the nonwoven carrier with bitumen.

In an embodiment, the at least two fiber layers of the first part and/or of the second part comprise at least two different kinds of mono-component fibers. In an embodiment, different types of mono-component fibers are used, wherein the at least two different kinds of mono-component fibers being preferably composed of polymers of different chemical construction having different melting points. It is preferred that the melting points of the at least two different polymers differ by at least 10° C., preferably by at least 20° C. More preferably the melting points differ by at least 50° C. Such a product could be thermally bonded, preferably by hot air, by subjecting the fiber layers in the connecting area to a temperature in the range of the melting point of the polymer with the lower melting point.

In an embodiment, the at least two fiber layers comprise bi-component fibers composed of two polymers of different chemical construction having different melting points.

Bi-component fibers are preferably fibers composed of two polymers of different chemical construction. A basic distinction is being drawn between three types of bi-component fibers: side-by-side types, core-sheath types and islands-in-the-sea types bi-component fibers. In an embodiment, the melting points of the two polymers building the bi-component fibers differ by at least 10° C., preferably at least 20° C. More preferably the melting points differ by at least 50° C. Such a nonwoven carrier material comprising bi-component fibers, in particular when composed of side-by-side types and/or core-sheath type bi-component fibers could be thermally bonded, preferably by hot air, by subjecting the fiber layers in the connecting area to a temperature in the range of the melting point of the polymer with the lower melting point. In a preferred embodiment the nonwoven carrier material is predominantly made from core-sheath type bi-component fibers in the first and second fiber layers, preferably filaments. Predominantly is understood to mean that at least 50% of the fibers comprised in the fiber layers are core-sheath type bi-component fibers, preferably at least 75%, more preferably at least 90%, even more preferably at least 95%, most preferably 100%. Preferably the core/sheath ratio in the core/sheath bi-component fibers lies between 95/5 Vol. % and 5/95 Vol. %. More preferably the core/sheath ratio lies between 50/50 Vol. % and 95/5 Vol. %.

In an embodiment, the sheath of the bi-component fibers comprises a polymer of a group of polymers comprising polyamides, polyolefins, halogenated polyolefins and copolymers or mixtures thereof.

In another embodiment, the core of the bi-component fibers comprises a polymer of a group of polymers comprising polyolefins, halogenated polyolefins, polyamides, polyesters and copolymers or mixtures thereof.

In another embodiment, the sheath of the core/sheath bi-component fibers consists mainly of a polyamide, preferably a polyamide-6 (PA6), and the core consists mainly of a polyester, preferably a polyethylene terephthalate (PET), for example for bitumen membranes, tufted carpets or vinyl flooring.

In another embodiment, the sheath of the core/sheath bi-component fibers consists mainly of a polyolefin, preferably a polypropylene, and the core consists mainly of a polyester, preferably a polyethylene terephthalate (PET), for example for tufted carpets or filter media.

In another embodiment, the sheath of the core/sheath bi-component fibers consists mainly of a polyester, preferably a co-polyester (co-PET), and the core consists mainly of a polyester, preferably a polyethylene terephthalate (PET), for example for bitumen membranes, tufted carpets, vinyl flooring or filter media.

In an embodiment, the connecting area extends perpendicular or in an angle to the main direction of the nonwoven carrier material. Preferably, the connecting area extends in an angle between 1° to 30°, preferably between 3° and 15° and more preferably between 5° and 10°, to the main extension direction of the nonwoven carrier material (see FIG. 3). Preferably, the connecting area extends over the entire cross machine direction. Preferably, the connecting area is a straight line, but for example a zig-zag like connecting area is also included.

In a further embodiment, the contact surfaces between the first part and the second part are enlarged for an increased seam strength in the connecting area. The enlargement of the contact surface of the first part and the second part can be obtained by increased difference in length of the first fiber layer of the first part and the second fiber layer of the first part, and even in the same manner at the second part. Preferably, the contact surfaces between the first part and the second part are enlarged by having additional fiber layers with alternating different lengths (see e.g. FIGS. 12 and 13). Also possible is that the connecting area comprises a non-linear shape like a zig zag connecting area or a wave shaped connecting area.

The nonwoven carrier material may comprise a first part having an inclined layer boundary with an angle β, and a second part having an inclined layer boundary complementary to angle β such that the first part and the second part form together a form-fit connection in the connecting area.

Figure 10:
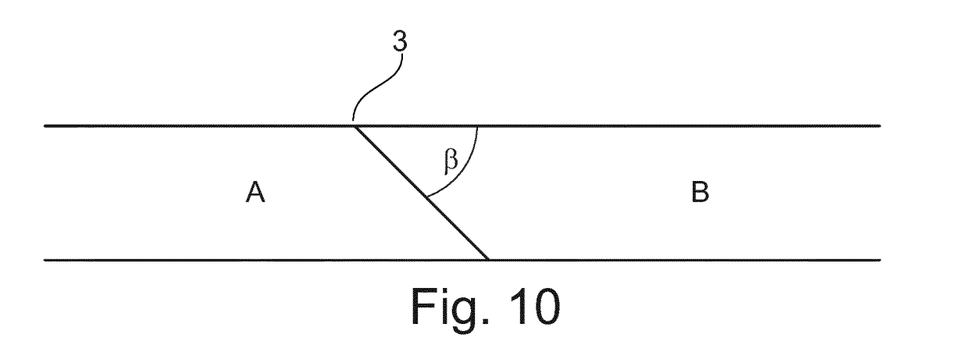
FIGS. 10 and 11 show schematically a connection of a first part and a second part of the nonwoven carrier material having inclined layer boundaries.

The form-fit connection of the first part and the second part of the nonwoven carrier material may have inclined layer boundaries with an angle β with respect to the main surfaces of the first part and the second part of the nonwoven carrier material, wherein the first part and the second area are connected via the inclined layer boundaries resulting in that the main surface of the first part and the second part are arranged in a single plane, as for example shown in FIG. 10.

Figure 11:
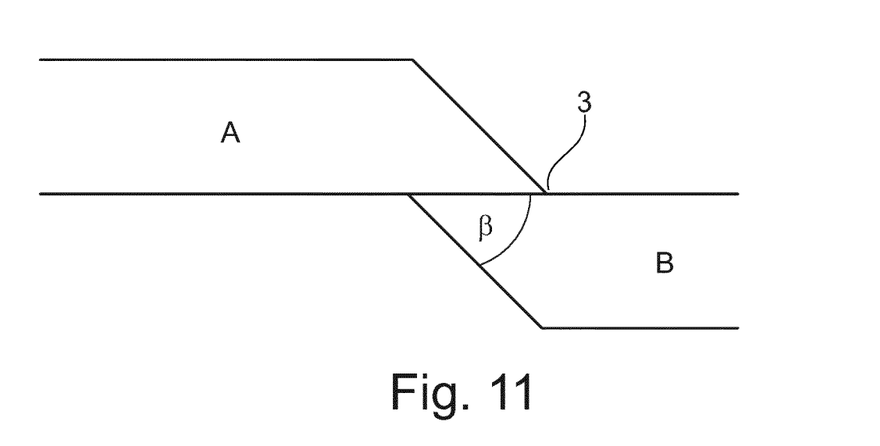

The form-fit connection of the first part and the second part of the nonwoven carrier material may alternatively exhibit a first part and a second part having inclined layer boundaries with an angle β with respect to the main surfaces of the first part and the second part of the nonwoven carrier material, wherein the first part and the second part are connected via a main surface of the first part and a main surface of the second part, as for example shown in FIG. 11. This arrangement allows for improved bonding by connecting the first part to the second part via the main surfaces of the first part and the second part which have not been processed to remove material to reduce the thickness. Although the main surfaces of the combined nonwoven carrier material may exhibit a shift in the connection area, the thickness of the connecting area can still exhibit equal thickness as compared to the remainder of the nonwoven carrier material.

A method is provided for connecting a nonwoven carrier material comprising a first part (A) having a thickness and a second part (B) having a thickness, wherein the first part (A) and the second part (B) comprise at least a first and a second thermoplastic fiber layer (A1, A2; B1, B2), wherein part of the thickness of the first part (A) and part of the thickness of second part (B) is removed to form the first thermoplastic fiber layer (A1, B1) and the second thermoplastic fiber layer (A2, B2) in such a way that the first part (A) and the second part (B) form together a form-fit connection in the connecting area.

Preferably, the removing of part of the thickness of the first part (A) and/or second part (B) is made by skiving, which is known for a person skilled in the art.

In an embodiment, the method comprises a separating method which is made before removing parts of the first thermoplastic fiber layer (A1, B1) and the second thermoplastic fiber layer (A2, B2), wherein the first part A is partially separated in the first thermoplastic fiber layer (A1) and the second thermoplastic fiber layer (A2) in a separating step and the second part B is partially separated in the first thermoplastic fiber layer (B1) and the second thermoplastic fiber layer (B2) in a separating step, wherein the first and the second thermoplastic fiber layers (A1, A2) of the first part (A) and the first and the second thermoplastic fiber layers (B1, B2) of the second part (B) are separated from each other in the separating step.

In an embodiment, in the method for connecting a nonwoven carrier material comprising a first part (A) and a second part (B), wherein both the first part (A) and the second part (B) comprise at least a first thermoplastic fiber layer (A1, B1) and a second thermoplastic fiber layer (A2, B2), the first part (A) is partially separated in the first thermoplastic fiber layer (A1) and the second thermoplastic fiber layer (A2) of the first part (A) in a separating step and the second part (B) is partially separated in the first thermoplastic fiber layer (B1) and the second thermoplastic fiber layer (B2) in a separating step, whereby the first thermoplastic fiber layer (A1) and the second thermoplastic fiber layer (A2) of the first part (A) and the first thermoplastic fiber layer (B1) and the second thermoplastic fiber layer (B2) of the second part (B) are separated from each other in the separating step and part of a thickness of the first part (A) and part of a thickness of second part (B) are removed to form the first thermoplastic fiber layer (A1, B1) and/or second thermoplastic fiber layer (A2, B2) in such a way that the length of the first thermoplastic fiber layer (A1) of the first part (A) is different to the length of the second thermoplastic fiber layer (A2) of the first part (A) and the length of the first thermoplastic fiber layer (B1) of the second part (B) is different to the length of the second thermoplastic fiber layer (B2) of the second part (B), whereby the sum of the length of the first thermoplastic fiber layer (A1) of the first part and the length of the first thermoplastic fiber layer (B1) of the second part is equal to the sum of the length of the second thermoplastic fiber layer (A2) of the first part and the length of the second thermoplastic fiber layer (B2) of the second part, whereby the first part and the second part are connected in a connecting area to form a connected nonwoven carrier material.

The method according to this disclosure is applicable for two different embodiments of the first part and the second part of nonwoven carrier material. In a first embodiment the first part and also the second part of the nonwoven carrier material comprises two independent thermoplastic fiber layers and in a second embodiment a single starting thermoplastic fiber layer, which is separated (partially, this means at least in the zone of the future connecting area) into two thermoplastic fiber layers as already described above, is used.

In the separating step for the first embodiment the two independent thermoplastic fiber layers are separated from each other (prior to that the fiber layers were laid together on top of each other (with or without consolidation). In the separating step for the second embodiment the single starting thermoplastic fiber layer is separated into two different layers (first and second thermoplastic fiber layer) at least over a length of the future connecting area. Preferably, the thickness and/or the weight of the first thermoplastic fiber layer is equal to the thickness and/or the weight of the second thermoplastic fiber layer, created from the single starting thermoplastic fiber layer (in the first part and/or the second part).

Preferably, the length of the first thermoplastic fiber layer of the first part differs from the length of the second thermoplastic fiber layer of the first part by at least 0.5 cm, preferably by at least 1 cm, more preferred by at least 2 cm.

Preferably, the length of the first thermoplastic fiber layer of the second part differs from the length of the second thermoplastic fiber layer of the second part by at least 0.5 cm, preferably by at least 1 cm, more preferred by at least 2 cm.

In an embodiment, a (following) permanent connection of the first part and the second part of the nonwoven carrier material in the connecting area is formed by a consolidation technique. Preferred techniques therefore include calendaring, mechanical needling, hydroentanglement, ultrasonic bonding, thermal bonding, preferably by hot air, or any combination thereof.

Preferably, a combination of mechanical needling of the connecting area followed by thermal bonding of the connecting area can be applied to result in increased strength in the connecting area due to entanglement of the fibers between the first part and the second part.

In a further embodiment, a suitable binder is used to improve the bonding between the first part and the second part of the nonwoven carrier material. The binder can be a chemical binder or a thermal binder such as a thermoset polymer, a pressure and heat activatable adhesive or an adhesive activated by irradiation such as by UV-irradiation.

In an embodiment, the connecting area extends perpendicular or in an angle, preferably in an angle of 20°, to the main extension direction of the nonwoven carrier material.

Preferably, a splitting device is used for separating the first thermoplastic fiber layer and the second thermoplastic fiber layer of the first part from each other and the first thermoplastic fiber layer and the second thermoplastic fiber layer of the second part from each other.

The invention is described further via the figures.

BRIEF DESCRIPTION OF THE DRAWINGS

FIGS. 1 and 2 (A+B) show schematically a combination of two parts of a nonwoven carrier material of the prior art.

FIG. 14 (A+B) schematically shows a first part and a second part of the nonwoven carrier material wherein a scrim is arranged in the first thermoplastic fiber layer of the first part, and a scrim is arranged in the second thermoplastic fiber layer of the second part of the nonwoven carrier material.

Figure 1:
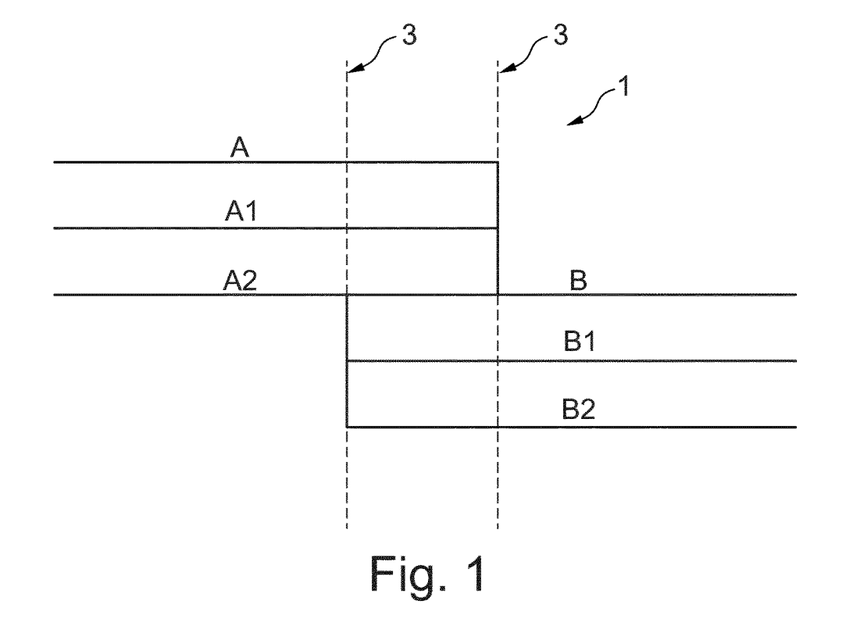

In FIG. 1 a connection of a first part A of a nonwoven carrier material 1 and a second part B of a nonwoven carrier material 1 is schematically shown (prior art). The first part A has a first thermoplastic fiber layer A1 and a second thermoplastic fiber layer A2. The second part B has also a first thermoplastic fiber layer B1 and a second thermoplastic fiber layer B2. For connecting the first part A and the second part B in a connecting area 3 the first part A is laid on top of the second part B. In the connection area 3 four fiber layers are arranged. Due to this the thickness and weight of the nonwoven carrier material 1 increases in the connecting area 3.

Figure 2A:
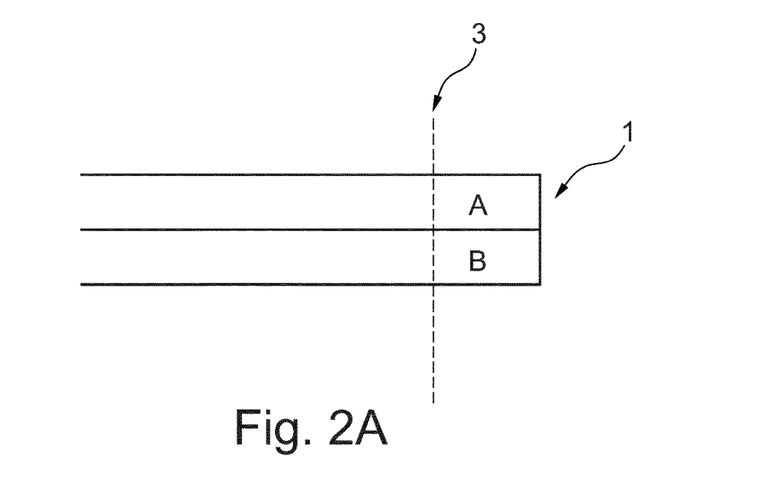
Figure 2B:
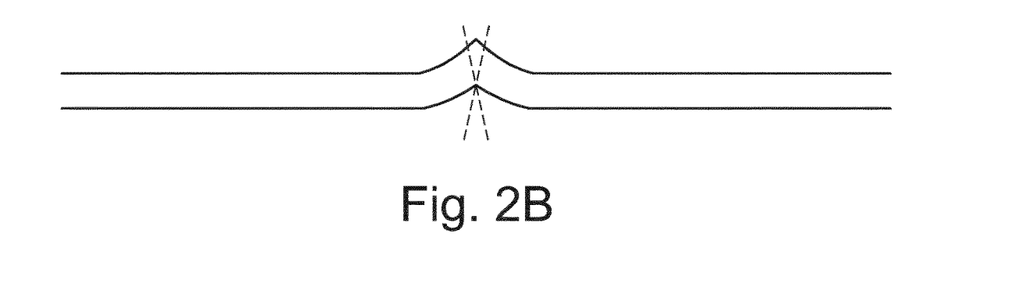

In FIGS. 2A and 2B an alternative embodiment of the prior art is shown. The nonwoven carrier material 1 comprises a first part A with a single fiber layer and a second part B with also a single fiber layer. Part A is laid on top of part B and then both parts A, B are permanent consolidated, for example by using a hot wire or an ultrasonic bonding/cutting step to simultaneously cut and consolidate part A and part B together. Thereafter part A and part B are folded open, whereby they are connected in the connecting area 3. Also in this embodiment is the thickness (and weight) of the nonwoven carrier material 1 increased in the connecting area 3. Furthermore, the strength of the nonwoven carrier material at the connecting area is lower than in the remainder of the nonwoven carrier material.

Figure 3:
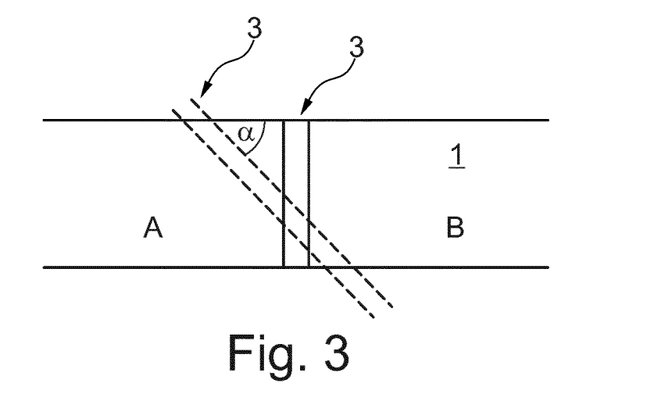
FIG. 3 shows schematically a nonwoven carrier material on a top view with a connecting area.

In FIG. 3 is shown a top view of a nonwoven carrier material 1 according to this disclosure. The nonwoven carrier material 1 comprises a first part A and a second part B. The first part A and the second part B are connected to each other in a connecting area 3. The connecting area 3 extends perpendicular to the main extension direction (see arrow X in FIG. 5) of the nonwoven carrier material 1 or in an angle α to the main extension direction (arrow X) of the nonwoven carrier material 1.

Figure 4:
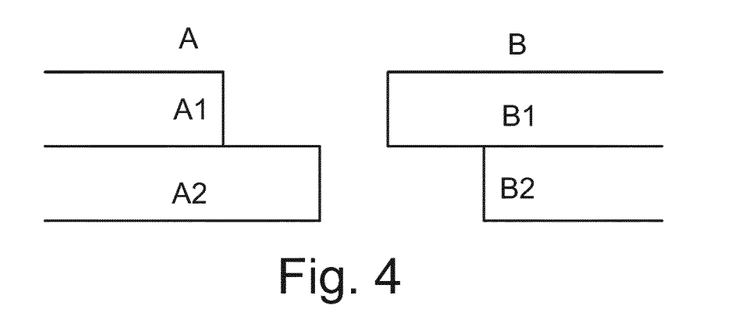
FIG. 4 shows schematically a first part and a second part of a nonwoven carrier material.

FIG. 4 shows a side view of a nonwoven carrier material 1 comprising a first part A with a first fiber layer A1 and a second fiber layer A2 and a second part B with a first fiber layer B1 and a second fiber layer B2. The first fiber layer A1 of the first part A has a different length than the second fiber layer A2 of the first part A. The first fiber layer B1 of the second part B has also a different length than the second fiber layer B2 of the second part B. However, the sum of the length of the first fiber layer A1 of the first part A and the length of the first fiber layer B1 of the second part B is equal to the sum of the length of the second fiber layer A2 of the first part A and the length of the second fiber layer B2 of the second part B. Due to this the first part A and the second part B fit together like puzzle parts.

Figure 5:
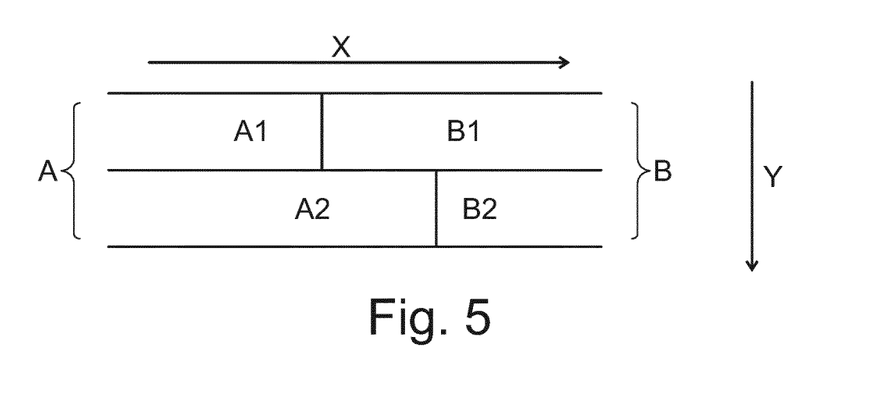
FIG. 5 shows schematically a connection of a first and second part of the nonwoven carrier material according to FIG. 4.

FIG. 5 shows a connection of the first part A and the second part B of FIG. 4 to create a nonwoven carrier material 1. The first part A and the second part B have a form-fit connection, whereby no thickness variation occurs (measured perpendicular (arrow Y) to the main extension direction (arrow X)) of the nonwoven carrier material 1. Due to this form-fit connection also a kind of force-fit connection is created and the first part A and the second part B can easily be (permanently) consolidated without slipping of one or more fiber layers during the process. The obtained material is a connected nonwoven carrier material 1.

Figure 6:
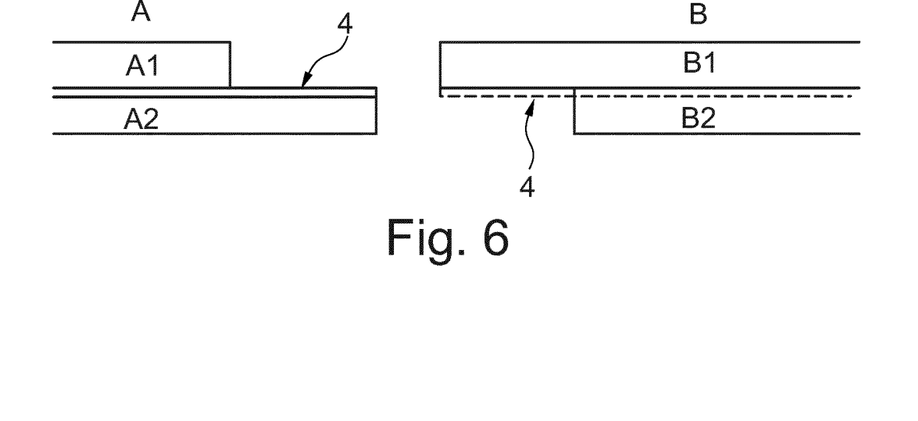
FIGS. 6 and 7 show schematically different embodiments of a first and a second part of the nonwoven carrier material.

FIG. 6 shows an embodiment of FIGS. 4 and 5 whereby a scrim 4 is arranged between the thermoplastic fiber layers A1, A2 and B1, B2. The scrim is arranged between the first and second fiber layers A1, A2, B1, B2 of the first part and second part A, B or only the first part A or the second part B comprises a scrim 4 (between the fiber layers). In the second embodiment a removing step removes also the scrim from the first part A or the second part B.

Figure 7:
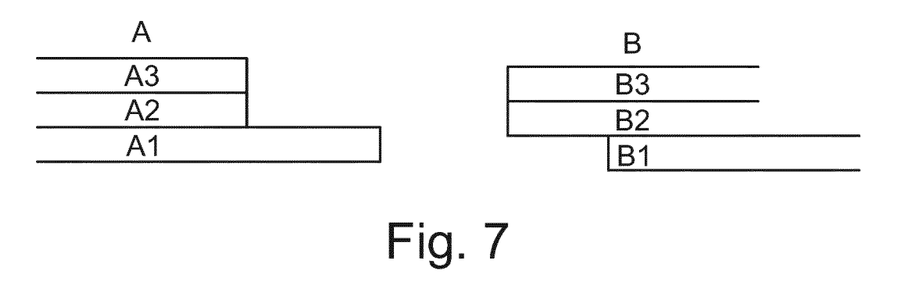

FIG. 7 shows an embodiment of the present disclosure with more than two thermoplastic fiber layers for every part. The first part A comprises a first thermoplastic fiber layer A1, a second thermoplastic fiber layer A2 and a third thermoplastic fiber layer A3. The length of the first thermoplastic fiber layer A1 differs from the length of the second and third thermoplastic fiber layer A2, A3. Whereby also in this example is the sum of the length of the first fiber layer A1 of the first part A and the length of the first fiber layer B1 of the second part B is equal to the sum of the length of the second fiber layer A2 (A3) of the first part A and the length of the second fiber layer B2 (B3) of the second part B. Thus, the present invention also works for nonwoven carrier materials comprising more than two fiber layers in one part. It should be understood, that one or more of the layers A1, A2, A3, B1, B2 and B3 could be made of other materials than fibers (for example foils).

Figure 8:
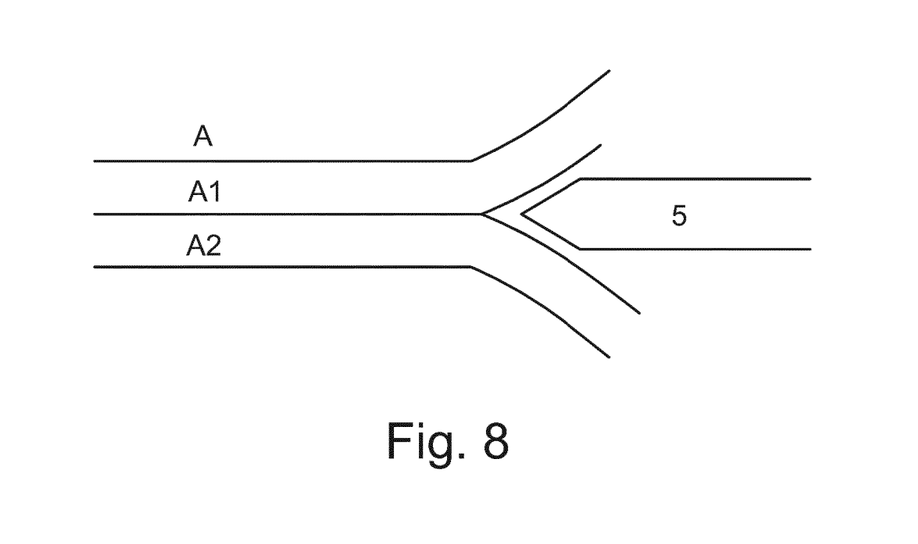
FIG. 8 shows schematically a splitting step of a first thermoplastic fiber layer and a second thermoplastic fiber layer.

FIG. 8 shows schematically a splitting process. The first part A comprises a first thermoplastic fiber layer A1 and a second thermoplastic fiber layer A2. A splitting device 5 separates the first thermoplastic fiber layer A1 and the second thermoplastic fiber layer A2 partially from each other, and a part of the first thermoplastic fiber layer A1 and/or the second thermoplastic fiber layer A2 is/are removed, preferably by cutting. The same procedure is done for the second part B (not shown in FIG. 8) of the nonwoven carrier material 1. Whereby the first fiber layer A1 (B1 not shown in FIG. 8) and the second fiber layer A2 (B2 not shown in FIG. 8) of the first part A and the second part B are formed in the disclosed way to create a form-fit connection (like FIGS. 4, 6, 7). Thereafter, the first part A and the second part B are connected with each other (see FIGS. 3, 5). The area, in which the first part A and the second part B are connected with each other, is called the connecting area 3 (not shown in FIG. 8). The splitting device 5 is part of a splitting machine. For example the firm Fortuna GmbH sold such splitting machines.

Other methods than splitting and cutting are included to realize the described form-fit connection (like puzzle parts).

Figure 9:
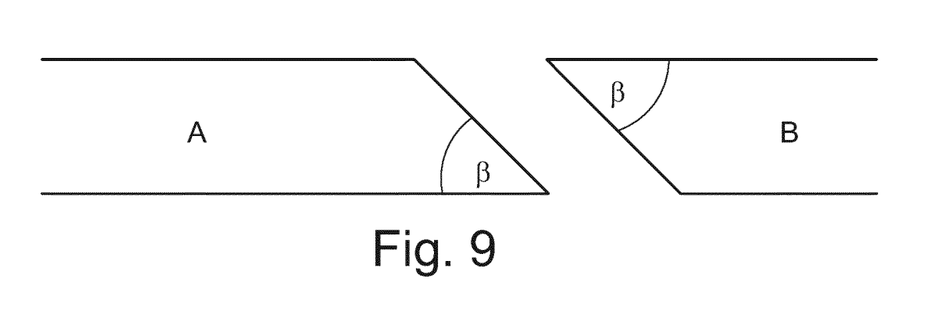
FIG. 9 shows schematically a first part and a second part of the nonwoven carrier material having inclined layer boundaries.

FIG. 9 shows a sideview of a first part A and a second part B of a nonwoven carrier material having inclined layer boundaries with an angle β.

FIG. 10 shows a side view of an embodiment of a connection of a first part A and a second part B of a nonwoven carrier material, wherein the connecting area 3 is an inclined connecting area with an angle β in view of the main surfaces of the first part A and second part B of the nonwoven carrier material.

FIG. 11 shows a side view of a connection of a first part A and a second part B of a nonwoven carrier material, wherein the first part A and the second part B having inclined layer boundaries with an angle β and are connected at the connecting area 3 on the main surfaces of the first part A and second part B. The first part A and second part B are connected in such a way, that the thickness of the connected layers in the connecting area is equal to the thickness of the entire nonwoven carrier material.

Figure 12:
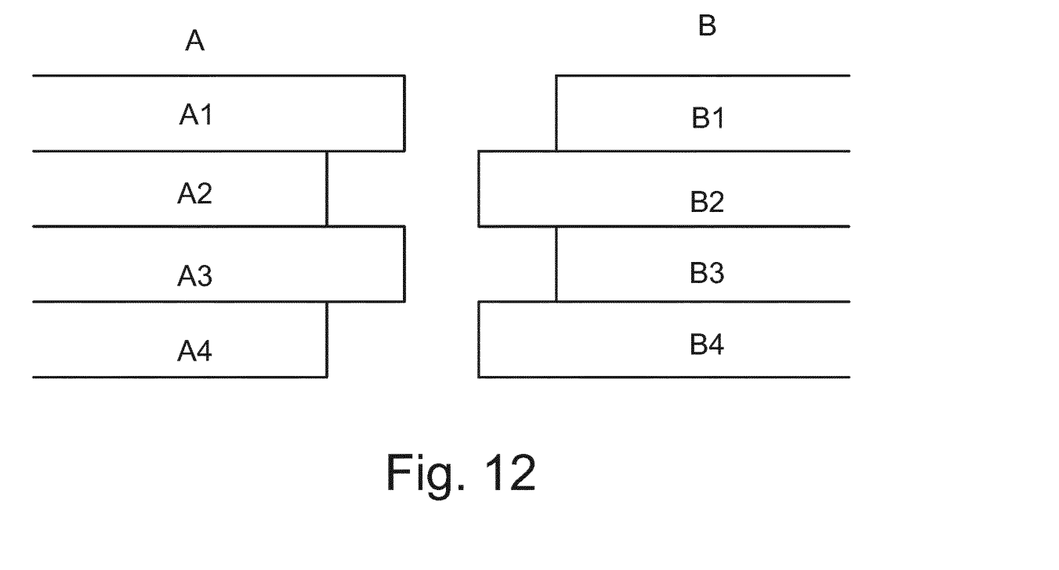
FIGS. 12 and 13 show schematically a first part and a second part of a nonwoven carrier material having respectively four and three layers of fibers with alternating different extensions.

FIG. 12 shows a sideview of a first part A and a first part B, wherein the first part A and the second part B comprise four fiber layers each (A1-A4 and B1-B4). The first fiber layer A1 (B1) has a different length to the second fiber layer A2 (B2). Subsequently, the second fiber layer A2 (B2) has a different length to the third layer A3 (B3) and also the third fiber layer A3 (B3) to the fourth fiber layer A4 (B4).

The differences in length between the layers are alternating, so that a zipper like form is obtained. Thereby, the even numbered layers A2 (B2) and A4 (B4) and/or the uneven numbered layers A1 (B1) and A3 (B3) do not need necessarily need the same lengths. The sum of the lengths of the fiber layers of all fiber layers are equal.

Figure 13:
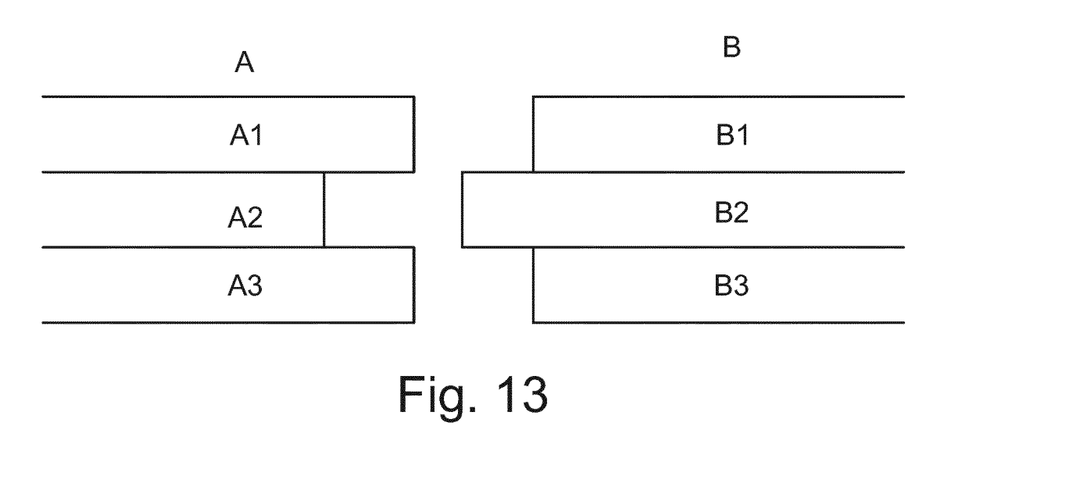

FIG. 13 shows a sideview of a first part A and a first part B, wherein the first part A and the second part B comprise three fiber layers each (A1-A3 and B1-B3). The first fiber layer A1 (B1) has a different length to the second fiber layer A2 (B2). Subsequently, the second fiber layer A2 (B2) has a different length to the third layer A3 (B3). The differences in length between the layers are alternating, so that a zipper like form is obtained. Thereby, the even numbered layers A2 (B2) do not need necessarily need the same lengths. The sum of the lengths of the fiber layers of all fiber layers are equal.

Figure 14A:
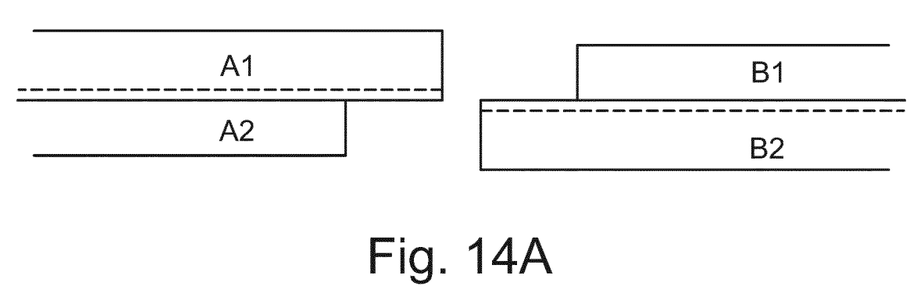
Figure 14B:
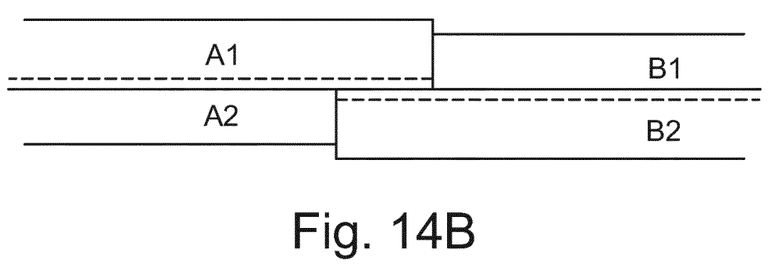

FIG. 14 schematically shows a first part and a second part of the nonwoven carrier material wherein a scrim is arranged in the first thermoplastic fiber layer of the first part, and a scrim is arranged in the second thermoplastic fiber layer of the second part of the nonwoven carrier material. In FIG. 14A a scrim (dashed line) is arranged in the first thermoplastic fiber layer A1 of the first part close to the interface between the first thermoplastic fiber layer A1 and the second thermoplastic fiber layer A2 of the first part. A scrim (dashed line) is also arranged in the second thermoplastic fiber layer B2 of the second part close to the interface between the second thermoplastic fiber layer B2 and the first thermoplastic fiber layer B1 of the second part. When a form-fit connecting is formed in the connecting interface in FIG. 14B, the scrims are arranged closely together which improved the load transfer between both scrims in the nonwoven carrier material.

The invention claimed is:

1. A nonwoven carrier material, comprising at least a first part having a thickness and a second part having a thickness,
    wherein the first part and the second part each comprise at least a first and a second thermoplastic fiber layer that are each comprised of fibers,
    wherein the fibers in the first and the second thermoplastic fiber layers of the first part and/or the second part are filaments,
    wherein the first part and the second part are connected with each other via a connecting area to form the nonwoven carrier material,
    wherein the first part and the second part form together a form-fit connection in the connecting area,
    wherein the nonwoven carrier material is obtained by a method comprising removing part of the thickness of the first part and part of the thickness of second part to form the first thermoplastic fiber layer and the second thermoplastic fiber layer in such a way that the first part and the second part together form the form-fit connection in the connecting area, and
    wherein the nonwoven carrier material is free of impregnant prior to forming the form-fit connection in the connecting area.

2. The nonwoven carrier material according to claim 1, wherein the length of the first thermoplastic fiber layer of the first part differs by at least 0.5 cm from the length of the second thermoplastic fiber layer of the first part and the length of the first thermoplastic fiber layer of the second part differs by at least 0.5 cm from the length of the second thermoplastic fiber layer of the second part, whereby the sum of the length of the first thermoplastic fiber layer of the first part and the length of the first thermoplastic fiber layer of the second part is equal to the sum of the length of the second thermoplastic fiber layer of the first part and the length of the second thermoplastic fiber layer of the second part.

3. The nonwoven carrier material according to claim 1, wherein the thickness variation of the nonwoven carrier material measured perpendicular (arrow Y) to the main extension area (arrow X) of the nonwoven carrier material is less than approximately 0.15 mm.

4. The nonwoven carrier material according to claim 1, wherein the average weight of the connecting area differs by at most 20 wt. % from the average weight of the nonwoven carrier material excluding the connecting area.

5. The nonwoven carrier material according to claim 1, wherein a scrim is arranged between the at least first and second thermoplastic fiber layers of the first part and second part.

6. The nonwoven carrier material according to claim 5, wherein the scrim is made of glass fibers or high modulus fibers of at least 5 GPa.

7. The nonwoven carrier material according to claim 1, wherein the filaments in the first and the second thermoplastic fiber layers of the first part and/or the second part comprise two types of mono-component filaments or comprise bi-component filaments.

8. The nonwoven carrier material according to claim 7, wherein the filaments are two types of mono-component filaments that are composed of polymers of different chemical construction having different melting points.

9. The nonwoven carrier material according to claim 7, wherein the filaments are bi-component filaments that are composed of two polymers of different chemical construction having different melting points.

10. The nonwoven carrier material according to claim 1, wherein the connecting area extends perpendicularly or in an angle to the main extension direction (arrow X) of the nonwoven carrier material.

11. The nonwoven carrier material according to claim 1, wherein the nonwoven carrier material is impregnated with impregnant following formation of the form-fit connection.

12. The nonwoven carrier material according to claim 11, wherein the impregnant comprises bitumen or polyvinyl chloride plastisol.

13. A method for forming the nonwoven carrier material according to claim 1, comprising removing part of the thickness of the first part and part of the thickness of second part to form the first thermoplastic fiber layer and the second thermoplastic fiber layer in such a way that the first part and the second part form together a form-fit connection in the connecting area.

14. The method according to claim 13 wherein the length of the first thermoplastic fiber layer of the first part differs by at least 0.5 cm from the length of the second thermoplastic fiber layer of the first part and the length of the first thermoplastic fiber layer of the second part differs by at least 0.5 cm from the length of the second thermoplastic fiber layer of the second part, whereby the sum of the length of the first thermoplastic fiber layer of the first part and the length of the first thermoplastic fiber layer of the second part is equal to the sum of the length of the second thermoplastic fiber layer of the first part and the length of the second thermoplastic fiber layer of the second part, whereby the first part and the second part are thereafter connected in a connecting area to form a connected nonwoven carrier material.

15. The method according to claim 13, wherein a permanent connection of the first part and the second part in the connecting area is formed by a consolidation technique.

16. The method according to claim 15, wherein the permanent connection of the first part and the second part in the connecting area is formed by a consolidation technique selected from the group consisting of calendaring, mechanical needling, hydroentanglement, ultrasonic bonding, thermal bonding, and any combination thereof.

17. The method according to claim 15, wherein the permanent connection of the first part and the second part in the connecting area is formed by a consolidation technique including thermal bonding by hot air.

18. The method according to claim 13, wherein the connecting area extends perpendicular or in an angle to the main extension direction of the nonwoven carrier material.

19. The method according to claim 13, wherein the removing includes separating the first thermoplastic fiber layer from the second thermoplastic fiber layer in the first part and the second part using a splitting device.

* * * * *